United States Patent
Wu et al.

(10) Patent No.: US 9,141,207 B2
(45) Date of Patent: Sep. 22, 2015

(54) TOUCH PANEL AND TOUCH DISPLAY DEVICE

(75) Inventors: Hsu-Ho Wu, Tainan (TW); Sung-Chun Lin, Tainan (TW); Hsuan-Chen Liu, Kaohsiung (TW); Yi-Chung Juan, Kaohsiung (TW)

(73) Assignee: HannStar Display Corporation, Taipei (TW)

( * ) Notice: Subject to any disclaimer, the term of this patent is extended or adjusted under 35 U.S.C. 154(b) by 315 days.

(21) Appl. No.: 13/488,462

(22) Filed: Jun. 5, 2012

(65) Prior Publication Data

US 2013/0154961 A1 Jun. 20, 2013

(30) Foreign Application Priority Data

Dec. 15, 2011 (CN) .......................... 2011 1 0421207

(51) Int. Cl.
*G06F 3/041* (2006.01)
(52) U.S. Cl.
CPC ...... *G06F 3/041* (2013.01); *G06F 2203/04107* (2013.01)
(58) Field of Classification Search
CPC ............................................ G06F 2203/04107
USPC .................................................. 345/173–179
See application file for complete search history.

(56) References Cited

U.S. PATENT DOCUMENTS

| | | | |
|---|---|---|---|
| 2009/0160824 A1* | 6/2009 | Chih-Yung et al. | 345/175 |
| 2010/0001973 A1* | 1/2010 | Hotelling et al. | 345/174 |
| 2011/0012841 A1* | 1/2011 | Lin | 345/173 |
| 2011/0216029 A1* | 9/2011 | Jin et al. | 345/173 |
| 2011/0279405 A1* | 11/2011 | Meng | 345/174 |
| 2011/0279410 A1* | 11/2011 | Han et al. | 345/174 |
| 2011/0285640 A1* | 11/2011 | Park et al. | 345/173 |
| 2011/0304571 A1* | 12/2011 | Kim et al. | 345/173 |
| 2013/0033450 A1* | 2/2013 | Coulson et al. | 345/174 |

FOREIGN PATENT DOCUMENTS

| | | |
|---|---|---|
| CN | 201654729 | 11/2010 |
| CN | 201725120 | 1/2011 |
| CN | 102243544 | 11/2011 |

OTHER PUBLICATIONS

"Office Action of China Counterpart Application," issued on Apr. 22 2015, p. 1-p. 12, in which the listed references were cited.

* cited by examiner

*Primary Examiner* — Amare Mengistu
*Assistant Examiner* — Jennifer Zubajlo
(74) *Attorney, Agent, or Firm* — Jianq Chyun IP Office

(57) ABSTRACT

A touch panel and a touch display device are disclosed, in which the touch panel includes a substrate, a touch component layer and a shielding-electrode film. The substrate has a surface. The touch component layer is disposed on the surface of the substrate and includes a metallic layer, an electrode layer, a protection layer and a hard coat layer. The protection layer is disposed between the metallic layer and the electrode layer. The hard coat layer at least covers the metallic layer and the electrode layer. The shielding-electrode film is disposed on the hard coat layer of the touch component layer, wherein the touch component layer is located between the substrate and the shielding-electrode film, and a resistance of the shielding-electrode film is greater than a resistance of the electrode layer.

21 Claims, 3 Drawing Sheets

TOUCH PANEL AND TOUCH DISPLAY DEVICE

CROSS-REFERENCE TO RELATED APPLICATION

This application claims the priority benefit of China application serial no. 201110421207.2, filed on Dec. 15, 2011. The entirety of the above-mentioned patent application is hereby incorporated by reference herein and made a part of this specification.

BACKGROUND OF THE INVENTION

1. Field of the Invention

The invention generally relates to a touch panel and a touch display device, and more particularly, to a touch panel and a touch display device with better touching sensitivity.

2. Description of Related Art

The existing touch panel comprises a glass substrate, a touch component layer and a transparent cover lens, in which the touch component layer is disposed on the glass substrate and located between the glass substrate and the transparent cover lens. In order to advance the operation characteristic of the touch panel, an electromagnetic shielding film is usually employed and adheres onto a surface of the glass substrate opposite to the transparent cover lens by using optical glue so as to increase the touching sensitivity of the touch panel. However, such design makes the whole thickness of the current touch panels unable to be effectively reduced so as to fail meeting the modern trend of slimming electronic products today. In this regard, how to effectively reduce the whole thickness of a touch panel and meanwhile advance the component operation characteristics of the touch panel becomes an important issue to be solved today.

SUMMARY OF THE INVENTION

Accordingly, the invention is directed to a touch panel with better touching sensitivity.

The invention is also directed to a touch display device employing the above-mentioned touch panel so as to have better touching sensitivity.

In order to achieve the above-mentioned objects, the invention provides a touch panel, which includes a substrate, a touch component layer and a shielding-electrode film. The substrate has a surface. The touch component layer is disposed on the surface of the substrate and includes a metallic layer, an electrode layer, a protection layer and a hard coat layer. The protection layer is disposed between the metallic layer and the electrode layer. The hard coat layer at least covers the metallic layer and the electrode layer. The shielding-electrode film is disposed on the hard coat layer of the touch component layer, wherein the touch component layer is located between the substrate and the shielding-electrode film, and a resistance of the shielding-electrode film is greater than a resistance of the electrode layer.

The invention also provides a touch display device, which includes a touch panel and a display panel. The touch panel includes a substrate, a touch component layer and a shielding-electrode film. The substrate has a surface. The touch component layer is disposed on the surface of the substrate and includes a metallic layer, an electrode layer, a protection layer and a hard coat layer. The protection layer is disposed between the metallic layer and the electrode layer. The hard coat layer at least covers the metallic layer and the electrode layer. The shielding-electrode film is disposed on the hard coat layer of the touch component layer, wherein the touch component layer is located between the substrate and the shielding-electrode film, and a resistance of the shielding-electrode film is greater than a resistance of the electrode layer. The display panel is disposed on the shielding-electrode film and the shielding-electrode film is located between the touch panel and the display panel.

Based on the description above, in the invention, both the touch component layer and the shielding-electrode film are disposed on a same substrate and the shielding-electrode film is disposed on the hard coat layer of the touch component layer, which can increase the touching sensitivity of the touch panel. In addition, since in comparison with the conventional touch panel, the touch panel of the invention has only one substrate, so that the invention is advantageous in a thinner thickness, a lighter weight and a less production cost.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
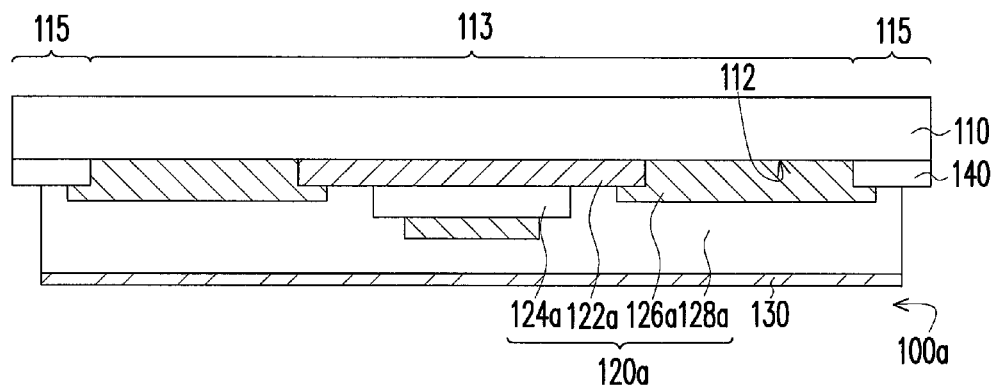
FIG. 1A is a schematic cross-sectional diagram of a touch panel according to an embodiment of the invention.

FIG. 1A is a schematic cross-sectional diagram of a touch panel according to an embodiment of the invention. Referring to FIG. 1A, a touch panel 100a includes a substrate 110, a touch component layer 120a and a shielding-electrode film 130. In more details, the substrate 110 has a surface 112, a component disposing region 113 and a peripheral region 115 surrounding the component disposing region 113, in which the substrate 110 is, for example, a cover lens made of, for example, glass or plastic.

The touch component layer 120a is disposed on the surface 112 of the substrate 110 and located within the component disposing region 113 of the substrate 110, in which the touch component layer 120a includes a metallic layer 122a, a protection layer 124a, an electrode layer 126a and a hard coat layer 128a. The protection layer 124a is disposed between the metallic layer 122a and the electrode layer 126a and the hard coat layer 128a at least covers the metallic layer 122a and the electrode layer 126a. Moreover, the metallic layer 122a of the embodiment is located on the surface 112 of the substrate 110, the protection layer 124a partially covers the metallic layer 122a, the electrode layer 126a is disposed on the surface 112 of the substrate 110 and the protection layer 124a and partially covers the metallic layer 122a, and the hard coat layer 128a covers the metallic layer 122a, the protection layer 124a and the electrode layer 126a. In addition, the material of the electrode layer 126a includes a transparent conductive material, for example, indium tin oxide (ITO) or indium zinc oxide (IZO), and the material of the hard coat layer 128a is, for example, photoresist materials.

The shielding-electrode film 130 is disposed on the hard coat layer 128a of the touch component layer 120a and the touch component layer 120a is disposed between the substrate 110 and the shielding-electrode film 130, in which the shielding-electrode film 130 entirely covers the hard coat layer 128a. The material of the shielding-electrode film 130 is for example, indium tin oxide (ITO), indium zinc oxide (IZO) or other appropriate transparent conductive materials. In particular, the resistance of the shielding-electrode film 130 is greater than the resistance of the electrode layer 126a, the resistance of the shielding-electrode film 130 is between 30 ohm and 200 ohm and the thickness of the shielding-electrode film 130 is less than or equal to (½~⅔) of the thickness of the electrode layer 126a.

In addition, the touch panel 100a of the embodiment further includes a shading layer 140, in which the shading layer 140 is disposed on the surface 112 of the substrate 110 and located at the peripheral region 115, the electrode layer 126a partially covers the shading layer 140 and the hard coat layer 128a exposes out a part of the shading layer 140.

Since in comparison with the conventional touch panel having a glass substrate and a transparent cover lens, the touch panel 100a of the embodiment has only one substrate 110, and the touch component layer 120a and the shielding-electrode film 130 are disposed on the substrate 110 so that the touch panel 100a of the embodiment is advantageous in a thinner thickness, a lighter weight and a less production cost. Moreover, since the shielding-electrode film 130 of the embodiment is directly disposed on the hard coat layer 128a of the touch component layer 120a, which can withstand the noise come from the external electronic apparatus (such as a display panel, unshown) and increase the touching sensitivity of the touch panel 100a in the embodiment.

More different embodiments are explained in following to describe touch panels 100b, 100c and 100d. It should be noted the component notations and partial details of the structures hereinafter provided in the embodiments can be the same as or similar to the previous embodiment, wherein the same notations represent the same or similar components while the repeated same details are omitted, which can refer to the previous embodiment.

Figure 1B:
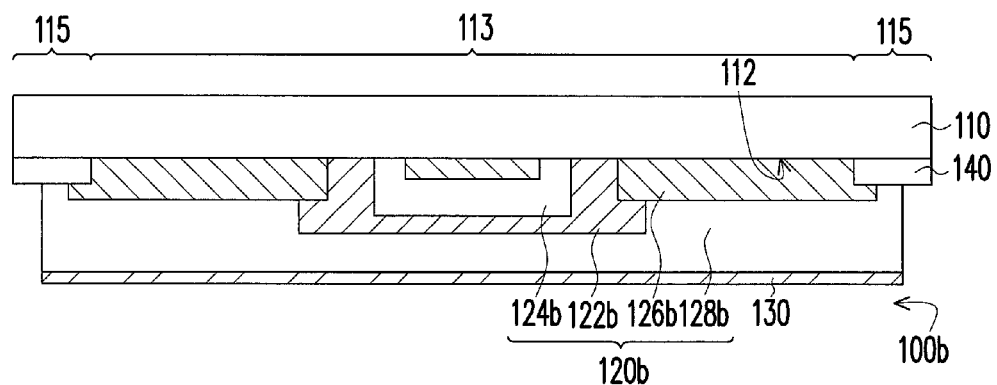
FIG. 1B is a schematic cross-sectional diagram of a touch panel according to another embodiment of the invention.

FIG. 1B is a schematic cross-sectional diagram of a touch panel according to another embodiment of the invention. Referring to FIG. 1B, a touch panel 100b of the embodiment is similar to the touch panel 100a of FIG. 1A except that the layout of the metallic layer 122b, the protection layer 124b, the electrode layer 126b and the hard coat layer 128b in the touch component layer 120b. In more details, in the embodiment, the electrode layer 126b is disposed on the surface 112 of the substrate 110, the protection layer 124b partially covers the electrode layer 126b, the metallic layer 122b covers the protection layer 124b and a part of the electrode layer 126b, and the hard coat layer 128b covers the metallic layer 122b, the electrode layer 126b and a part of the shading layer 140.

Figure 1C:
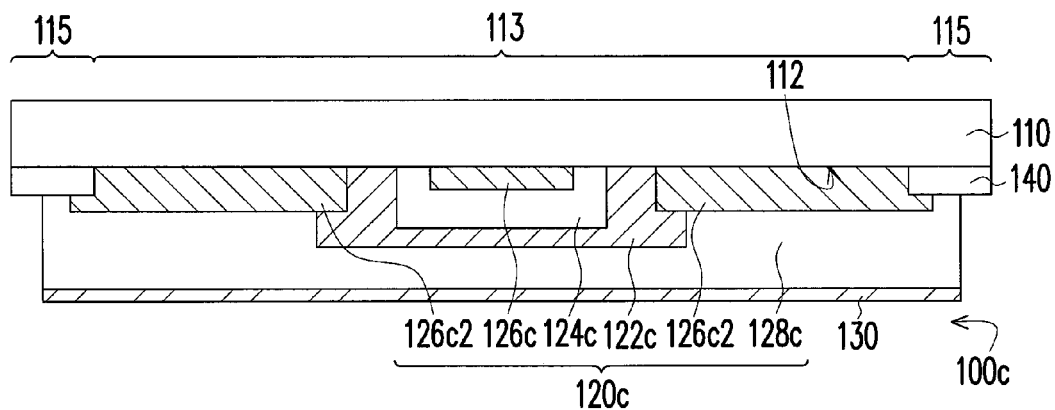
FIG. 1C is a schematic cross-sectional diagram of a touch panel according to yet another embodiment of the invention.

It should be noted that the partial electrode layer 126b covered by the protection layer 124b can be simultaneously formed with the rest part of the electrode layer 126b uncovered by the protection layer 124b. That is to say, after the electrode layer 126b is formed and then the protection layer 124b is formed, in which the protection layer 124b only covers a part of the electrode layer 126b. In yet another embodiment shown by FIG. 1C, it is allowed to form a part of the electrode layer 126c1 first in the touch component layer 120c of the touch panel 100c, then, the protection layer 124c entirely covering the partial electrode layer 126c1 is formed and finally another part of the electrode layer 126c2 is formed, Referring to FIG. 1C, a part of the electrode layer 126c1 is formed first in the touch component layer 120c of the touch panel 100c; then, the protection layer 124c entirely covering the partial electrode layer 126c1 is formed and finally another part of the electrode layer 126c2 is formed. In such process, the partial electrode layer 126c1 covered by the protection layer 124c is not simultaneously formed with the rest part 126c2 of the electrode layer 126c uncovered by the protection layer 124c.

Figure 1D:
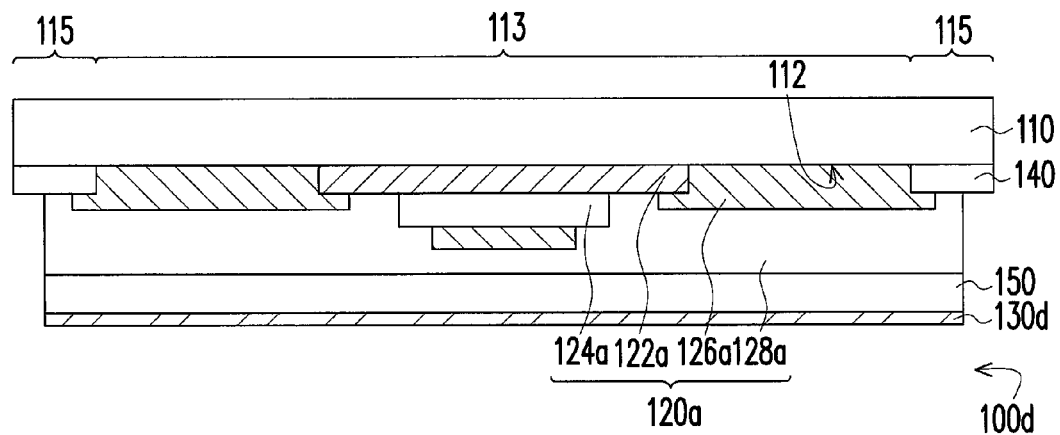
FIG. 1D is a schematic cross-sectional diagram of a touch panel according to yet another embodiment of the invention.

FIG. 1D is a schematic cross-sectional diagram of a touch panel according to yet another embodiment of the invention. Referring to FIG. 1D, a touch panel 100d of the embodiment is similar to the touch panel 100a of FIG. 1A except that the touch panel 100d of the embodiment further includes an anti-splinted layer 150 disposed between the shielding-electrode film 130d and the hard coat layer 128a of the touch component layer 120a for enhancing the mechanical strength of the touch panel 100d, in which the material of the anti-splinted layer 150 is, for example, polyester polymers or other suitable materials.

It should be noted that in other unshown embodiments, the touch panels 100b and 100c can also employ the anti-splinted layer 150 mentioned in the previous embodiment, and people skilled in the art can refer to the previous embodiment to select the above-mentioned component according to the application practice to achieve the required technical effect.

Figure 2A:
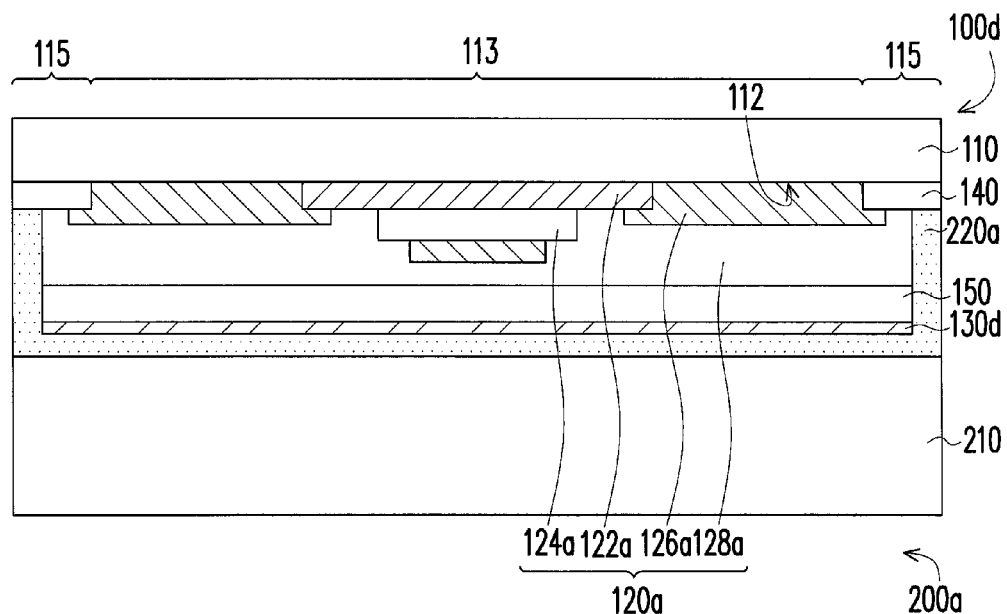
FIG. 2A is a schematic cross-sectional diagram of a touch display device according to an embodiment of the invention.

FIG. 2A is a schematic cross-sectional diagram of a touch display device according to an embodiment of the invention. Referring to FIG. 2A, in the embodiment, a touch display device 200a includes a touch panel 100d and a display panel 210, wherein the touch panel 100d of FIG. 1D serves as an example, but in other embodiments, the touch panel can be the touch panel 100a of FIG. 1A, the touch panel 100b of FIG. 1B or the touch panel 100c of FIG. 1C, which the invention is not limited to.

The display panel 210 is disposed on the shielding-electrode film 130d and the shielding-electrode film 130d is located between the touch panel 100d and the display panel 210, in which the display panel 210 is, for example, a liquid crystal display (LCD) panel, an organic light-emitting display (OLED) panel, a plasma display panel, an electronic-paper display panel, an electrowetting display panel or an electrophoretic display panel.

In the embodiment, the touch display device 200a further includes an adhering layer 220a, in which the adhering layer 220a is disposed between the touch panel 100d and the display panel 210 and encapsulates the touch component layer 120a, the anti-splinted layer 150 and the side-edge of the shielding-electrode film 130d and covers the partial shading layer 140 exposed by the hard coat layer 128a. The touch panel 100d herein entirely adheres onto the display panel 210 through the adhering layer 220a so as to finish the assembling of the touch display device 200a.

Figure 2B:
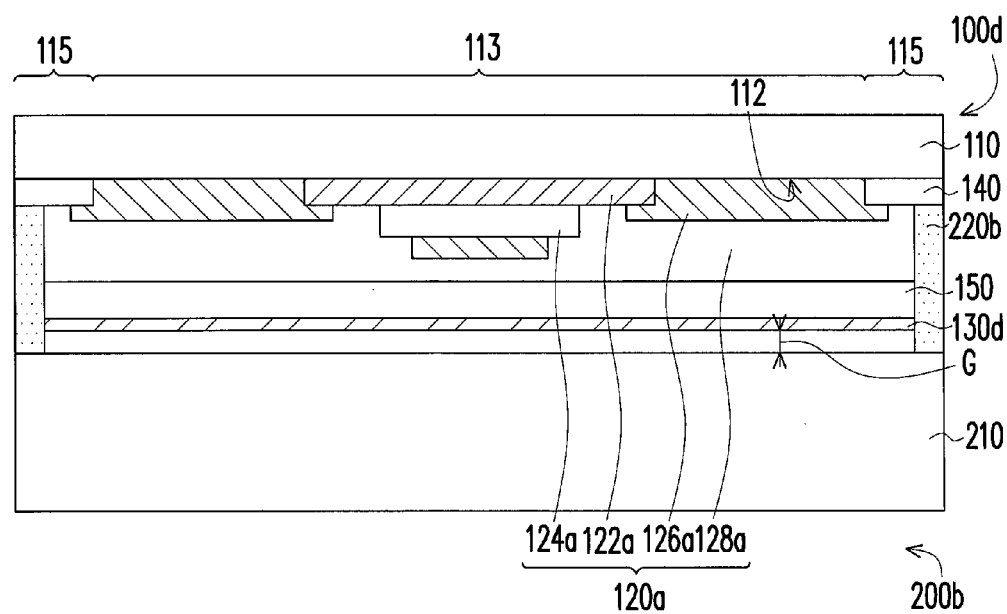
FIG. 2B is a schematic cross-sectional diagram of a touch display device according to another embodiment of the invention.

FIG. 2B is a schematic cross-sectional diagram of a touch display device according to another embodiment of the invention. It should be noted the component notations and partial details of the structures hereinafter provided in the embodiments can be the same as or similar to the previous embodiment, wherein the same notations represent the same or similar components while the repeated same details are omitted, which can refer to the previous embodiment.

Referring to FIG. 2B, the major difference of the touch display device 200b of the embodiment from the touch display device 200a in the previous embodiment rests in the adhering layer of the touch display device 200b is a frame-type adhering layer 220b, in which the frame-type adhering layer 220b is disposed on the partial shading layer 140 exposed by the hard coat layer 128a, the frame-type adhering layer 220b encapsulates the touch component layer 120a, the anti-splinted layer 150 and the side-edge of the shielding-electrode film 130d and extends to be connected onto the display panel 210, and there is a gap G between the display panel 210 and the touch panel 100d. That is to say, the touch panel 100d adheres onto the display panel 210 through the adhering layer 220b so as to finish the assembling of the touch display device 200b. The touch panel 100d and the display panel 210 herein have a gap G therebetween.

Since the touch panel 100d of the embodiment has only one substrate 110 and both the touch component layer 120a and the shielding-electrode film 130 are disposed on the substrate 110, the touch panel 100d is advantageous in a thinner thickness, a lighter weight and a less production cost. In addition, after the touch panel 100d and the display panel 210 are assembled together to form the touch display device 200a or 200b, the touch display device 200a or 200b meets the requirement of the today's slimming tendency. Moreover, since the shielding-electrode film 130 of the embodiment is directly disposed on the hard coat layer 128a of the touch component layer 120a, which can withstand the noise come from the display panel 210 and increase the touching sensitivity of the touch display device 200a or 200b in the embodiment.

In summary, in the invention, both the touch component layer and the shielding-electrode film are disposed on a same substrate and the shielding-electrode film is disposed on the hard coat layer of the touch component layer, which can increase the touching sensitivity of the touch panel. In addition, since in comparison with the conventional touch panel, the touch panel of the invention has only one substrate, so that the invention is advantageous in a thinner thickness, a lighter weight and a less production cost. Furthermore, after the touch panel and the display panel are assembled, the touch display device has a better touching sensitivity and meets the requirement of the today's slimming tendency.

It will be apparent to those skilled in the art that the descriptions above are several preferred embodiments of the invention only, which does not limit the implementing range of the invention. Various modifications and variations can be made to the structure of the invention without departing from the scope or spirit of the invention. The claim scope of the invention is defined by the claims hereinafter.

What is claimed is:

1. A touch panel, comprising:
    a substrate, having a surface;
    a touch component layer, disposed on the surface of the substrate, the touch component layer comprising:
        a metallic layer;
        an electrode layer;
        a protection layer, disposed between the metallic layer and the electrode layer; and
        a hard coat layer, at least covering the metallic layer and the electrode layer; and
    a shielding-electrode film, disposed on the hard coat layer of the touch component layer and electrically isolated from the touch component layer, wherein the touch component layer is located between the substrate and the shielding-electrode film, and a resistance of the shielding-electrode film is greater than a resistance of the electrode layer.

2. The touch panel as claimed in claim 1, wherein a thickness of the shielding-electrode film is less than or equal to (½~⅔) of a thickness of the electrode layer.

3. The touch panel as claimed in claim 1, wherein the resistance of the shielding-electrode film is between 30 ohm and 120 ohm.

4. The touch panel as claimed in claim 1, wherein the metallic layer is located on the surface of the substrate, the protection layer partially covers the metallic layer, the electrode layer is disposed on the surface of the substrate and the protection layer and partially covers the metallic layer, and the hard coat layer covers the metallic layer, the protection layer and the electrode layer.

5. The touch panel as claimed in claim 1, wherein the electrode layer is disposed on the surface of the substrate, the protection layer partially covers the electrode layer, the metallic layer covers the protection layer and a part of the electrode layer, and the hard coat layer covers the metallic layer and the electrode layer.

6. The touch panel as claimed in claim 1, further comprising an anti-splinted layer disposed between the shielding-electrode film and the hard coat layer of the touch component layer.

7. The touch panel as claimed in claim 6, wherein a material of the anti-splinted layer comprises polyester polymers.

8. The touch panel as claimed in claim 1, further comprising a shading layer, wherein the substrate has a component disposing region and a peripheral region surrounding the component disposing region, the shading layer is disposed on the surface of the substrate and located at the peripheral region, the touch component layer is located at the component disposing region, the electrode layer partially covers the shading layer, and the hard coat layer exposes out a part of the shading layer.

9. The touch panel as claimed in claim 1, wherein the substrate is a cover lens and a material of the cover lens comprises glass or plastic.

10. A touch display device, comprising:
    a touch panel, comprising:
        a substrate, having a surface;
        a touch component layer, disposed on the surface of the substrate, the touch component layer comprising:
            a metallic layer;
            an electrode layer;
            a protection layer, disposed between the metallic layer and the electrode layer; and
            a hard coat layer, at least covering the metallic layer and the electrode layer;
        a shielding-electrode film, disposed on the hard coat layer of the touch component layer and electrically isolated from the touch component layer, wherein the touch component layer is located between the substrate and the shielding-electrode film, and a resistance of the shielding-electrode film is greater than a resistance of the electrode layer; and
    a display panel, disposed on the shielding-electrode film and the shielding-electrode film is located between the touch panel and the display panel.

11. The touch display device as claimed in claim 10, wherein the display panel comprises a liquid crystal display (LCD) panel, an organic light-emitting display (OLED) panel, a plasma display panel, an electronic-paper display panel, an electrowetting display panel or an electrophoretic display panel.

12. The touch display device as claimed in claim 10, wherein a thickness of the shielding-electrode film is less than or equal to (½~⅔) of a thickness of the electrode layer.

13. The touch display device as claimed in claim 10, wherein the resistance of the shielding-electrode film is between 30 ohm and 120 ohm.

14. The touch display device as claimed in claim 10, wherein the metallic layer is located on the surface of the substrate, the protection layer partially covers the metallic layer, the electrode layer is disposed on the surface of the substrate and the protection layer and partially covers the metallic layer, and the hard coat layer covers the metallic layer, the protection layer and the electrode layer.

15. The touch display device as claimed in claim 10, wherein the electrode layer is disposed on the surface of the substrate, the protection layer partially covers the electrode layer, the metallic layer covers the protection layer and a part of the electrode layer, and the hard coat layer covers the metallic layer and the electrode layer.

16. The touch display device as claimed in claim 10, further comprising an anti-splinted layer disposed between the shielding-electrode film and the hard coat layer of the touch component layer.

17. The touch display device as claimed in claim 16, wherein a material of the anti-splinted layer comprises polyester polymers.

18. The touch display device as claimed in claim 10, wherein the substrate is a cover lens and a material of the cover lens comprises glass or plastic.

19. The touch display device as claimed in claim 10, further comprising a shading layer, wherein the substrate has a component disposing region and a peripheral region surrounding the component disposing region, the shading layer is disposed on the surface of the substrate and located at the peripheral region, the touch component layer is located at the component disposing region, the electrode layer partially covers the shading layer, and the hard coat layer exposes out a part of the shading layer.

20. The touch display device as claimed in claim 19, further comprising an adhering layer disposed between the touch panel and the display panel, encapsulating the touch component layer and the side-edge of the shielding-electrode film and covering the partial shading layer exposed by the hard coat layer.

21. The touch display device as claimed in claim 19, further comprising a frame-type adhering layer disposed on the partial shading layer exposed by the hard coat layer, wherein the frame-type adhering layer encapsulates the touch component layer and the side-edge of the shielding-electrode film and extends to be connected onto the display panel, and there is a gap between the display panel and the touch panel.

* * * * *